United States Patent
Arimilli et al.

[19]

[11] Patent Number: 6,038,642
[45] Date of Patent: Mar. 14, 2000

[54] METHOD AND SYSTEM FOR ASSIGNING CACHE MEMORY UTILIZATION WITHIN A SYMMETRIC MULTIPROCESSOR DATA-PROCESSING SYSTEM

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 08/992,134

[22] Filed: Dec. 17, 1997

[51] Int. Cl.[7] .................................................. G06F 12/00
[52] U.S. Cl. ............................ 711/130; 711/121; 711/145
[58] Field of Search .................................. 711/113, 121, 711/130, 129, 147, 145, 120

[56] References Cited

U.S. PATENT DOCUMENTS

| | | | |
|---|---|---|---|
| 4,511,964 | 4/1985 | Georg et al. | 364/200 |
| 5,572,695 | 11/1996 | Andrews et al. | 395/412 |
| 5,875,464 | 2/1999 | Kirk | 711/129 |
| 5,887,138 | 3/1999 | Hagersten et al. | 395/200.45 |
| 5,890,013 | 3/1999 | Nair et al. | 395/873 |
| 5,895,487 | 4/1999 | Boyd et al. | 711/122 |

*Primary Examiner*—Eddie P. Chan
*Assistant Examiner*—Kimberly McLean
*Attorney, Agent, or Firm*—Volel Emile; Antony P. Ng; Andrew J. Dillon

[57] ABSTRACT

A method and system for enhancing cache memory utilization within a symmetric multiprocessor data-processing system are disclosed. The symmetric multiprocessor data-processing system includes several processing units. These processing units are typically coupled to a system memory via an interconnect. Each of the processing units includes at least one cache memory for storing a subset of data contained within the system memory. Each of the processing units also includes a cache controller for controlling its associated cache memory. Each cache controller includes a mode select to allow an associated cache memory to be selectively operated under a shared mode or a private mode.

7 Claims, 2 Drawing Sheets

METHOD AND SYSTEM FOR ASSIGNING CACHE MEMORY UTILIZATION WITHIN A SYMMETRIC MULTIPROCESSOR DATA-PROCESSING SYSTEM

BACKGROUND OF THE INVENTION

1. Technical Field

The present invention relates to a method and system for utilizing cache memories in general and, in particular, to a method and system for utilizing cache memories within a symmetric multiprocessor data-processing system. Still more particularly, the present invention relates to a method and system for enhancing cache memory utilization within a symmetric multiprocessor data-processing system.

2. Description of the Prior Art

In a symmetric multiprocessor (SMP) data-processing system, all of the processing units are generally identical; that is, they all have the same architecture and utilize a common set or subset of instructions and protocols to operate. Typically, each processing unit includes a processor core having at least one execution unit for carrying out program instructions. In addition, each processing unit may include at least one level of caches, commonly referred to as L1 or primary caches, which are implemented with high-speed memories. In most cases, a second level of caches, commonly referred to as L2 or secondary caches, may also be included in each processing unit for supporting the first level caches. Each level of cache stores a subset of the data and instructions contained in a system memory for low latency access by the processor cores.

Within an SMP environment, if a first processing unit contains a modified copy of data that is being requested by a second processing unit, the first processing unit does not send the requested data to a system memory for access by the second processing unit; instead, a cache-to-cache transfer of the requested data from the first processing unit to the second processing unit is performed. Upon receipt of the cache-to-cache transfer of the requested data, the second processing unit returns an acknowledgement of the receipt to the first processing unit. The process of transferring data from one processing unit to another processing unit on a system bus without going through a system memory is referred to as "intervention." An intervention protocol improves system performance by reducing the number of cases in which the high latency system memory must be accessed in order to satisfy a read or read-with-intent-to-modify request by any one of the processing units within the SMP data-processing system.

Because the latency associated with system memory access are generally quite large, apparently it would be advantageous to maintain as much useful data in at least one of the cache memories as possible to allow for intervention such that system memory access may be avoided. To that end, the present invention provides an improved method and system for enhancing cache memory utilization within a SMP data-processing system such that the frequency of system memory accesses is minimized.

SUMMARY OF THE INVENTION

In view of the foregoing, it is therefore an object of the present invention to provide an improved method and system for utilizing cache memories.

It is another object of the present invention to provide an improved method and system for utilizing cache memories within a symmetric multiprocessor data-processing system.

It is yet another object of the present invention to provide an improved method and system for enhancing cache memory utilization within a symmetric multiprocessor data-processing system.

In accordance with the method and system of the present invention, a symmetric multiprocessor data-processing system includes several processing units. These processing units are typically coupled to a system memory via an interconnect. Each of the processing units includes at least one cache memory for storing a subset of data contained within the system memory. Each of the processing units also includes a cache controller for controlling its associated cache memory. Each cache controller includes a mode select to allow an associated cache memory to be selectively operated under a shared mode or a private mode.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be applicable to any symmetric multiprocessor (SMP) data-processing system in which each processing unit has at least one associated local cache memory.

Figure 1:
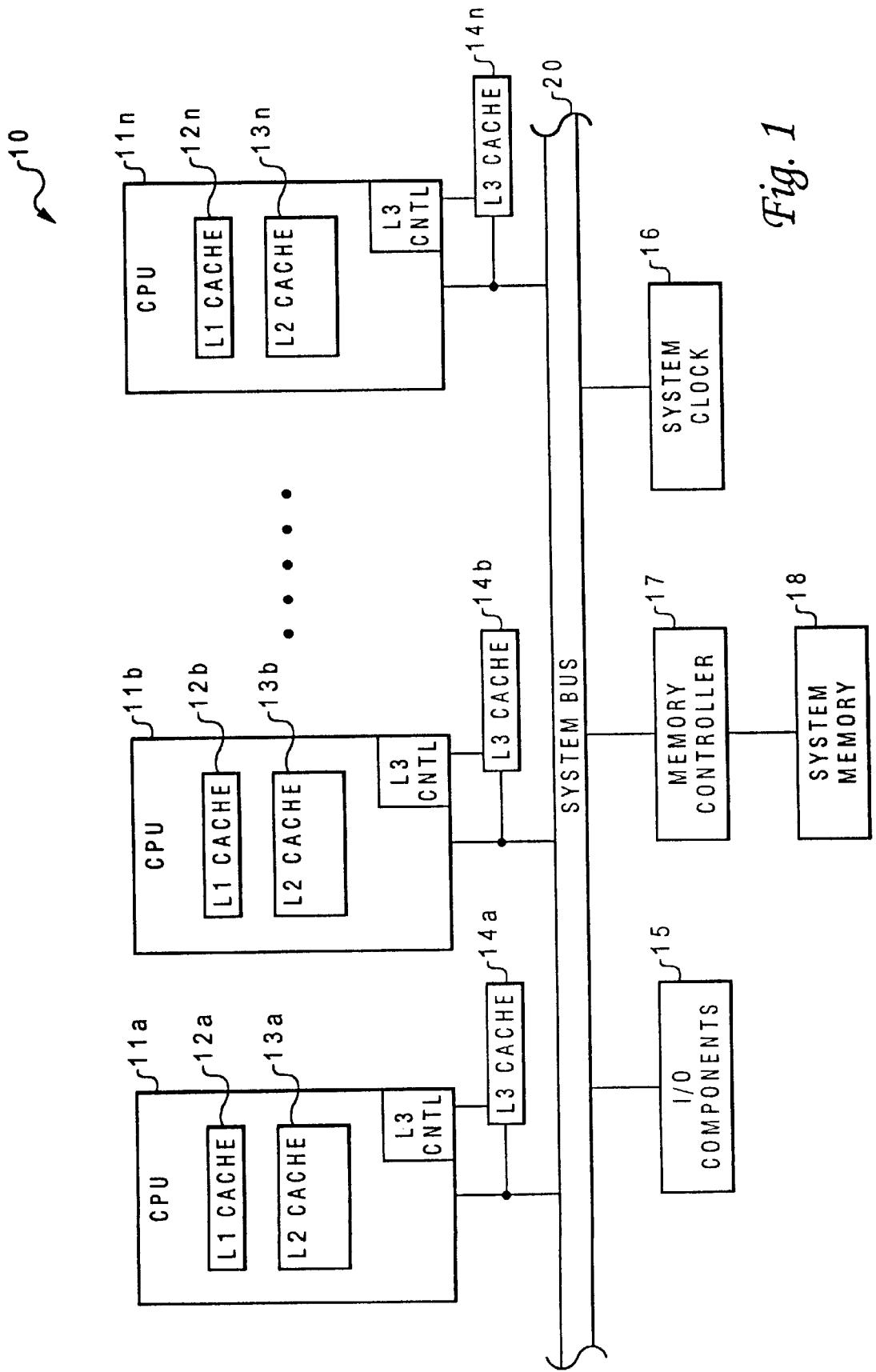
FIG. 1 is a block diagram of a SMP data-processing system in which the present invention may be implemented.

Referring now to the drawings and, in particular, to FIG. 1, there is depicted a block diagram of a SMP data-processing system 10 in which the present invention may be implemented. SMP data-processing system 10 includes multiple central processor units (CPUs) 11a–11n, and each of CPUs 11a–11n contains as least one level of local cache. As shown, CPU 11a contains a primary cache 12a and a secondary cache 13a, CPU 11b contains a primary cache 12b and a secondary cache 13b, while CPU 11n contains a primary cache 12n and a secondary cache 13n. In addition, each of CPUs 11a–11n also includes an L3 cache controller for controlling a corresponding one of tertiary caches 14a–14n.

All CPUs 11a–11n are coupled to an interconnect such as a system bus 20. For enhanced scalability, the interconnect may also be implemented by utilizing a cross-bar switch. A system clock 16 is coupled to system bus 20 for supplying clock signals to all the components within SMP data-processing system 10, including I/O components 15. Memory controller 17 is coupled to a system memory 18, which contains various instructions and data for the normal operations of SMP data-processing system 10.

For the purpose of illustration, a CPU, a primary cache, a secondary cache, and a tertiary cache (such as CPU 11a, primary cache 12a, secondary cache 13a, and tertiary cache 14a, as depicted in FIG. 1) may be collectively known as a processing unit. Although a preferred embodiment of an SMP data-processing system is described in FIG. 1, it should be understood that the present invention can be practiced within a variety of SMP data-processing system configurations.

A preferred size allocation for each level of the memory hierarchy within SMP data-processing system 10 is as follows. Each primary cache is 64 KBytes total in size, with 32 KBytes for instruction-caching and 32 KBytes for data-caching. Each secondary cache is 512 KBytes and each tertiary cache is 4 MBytes. The system memory is approximately 4 GBytes. The latency associated with accessing each level of the memory hierarchy is typically one processor-clock cycle, five processor-clock cycles, 17 processor-clock cycles, and 65 processor-clock cycles for the primary cache, the secondary cache, the tertiary cache, and the system memory, respectively.

Based on these access times, it would be advantageous to reduce the frequency of system memory accesses as much as possible in order to maintain a high system performance. This can be accomplished by maintaining as much useful data (and/or instructions) in at least one of cache memories 12–14 as possible, in other words, by maintaining a relatively high "cache hit" ratio.

In the prior art, each of the cache memories typically contains data that are only pertinent to its associated local processing unit. For example, L3 cache 14a generally contains data that is germane to the program execution of CPU 11a, L3 cache 14b generally contains data that is germane to the program execution of CPU 11b, and L3 cache 14n generally contains data that is germane to the program execution of CPU 11n. In these cases, each processing unit accesses data or instruction from distinctively different address ranges within the system memory, and there is seldom a situation when certain data requested by a processing unit is stored within a local cache of another processing unit. As a result, system memory accesses typically increase when the requested data is not in the local caches, which will lead to a substantial performance penalty to the entire SMP data-processing system when the frequency of system memory access becomes too high.

However, when all processing units are concurrently accessing a relatively small common area of the system memory, it is quite common to have the same data stored within the local caches of each processing unit. For example, all L3 caches 14a–14n may contain much of the same data if CPU 11a–11n are executing an identical program in parallel. In this kind of setup, when certain data or instructions requested by a processing unit are not in its local caches, it is likely that the requested data or instructions will also not be present in a local cache of any other processing unit within the SMP data-processing system. As a result, the frequency of access to the system memory is again increased.

Nevertheless, there are also other situations when the requested data is stored within a local cache of another processing unit within the SMP data-processing system. In those situations, e.g., when some data requested by CPU 11a happens to be present within L3 cache 14b, an intervention protocol may be invoked in order to source the requested data from L3 cache 14b to CPU 11a via a cache-to-cache transfer such that system memory access can be avoided. But this kind of situation is less likely to occur when each individual processing unit is accessing data from distinctively different address ranges within the system memory.

Broadly speaking, there is a natural dichotomy in the number of ways a software program may be executed within a SMP data-processing system. For example, when a program is very large, the execution of the program may be distributed among all the processing units within the SMP data-processing system such that the processing units are accessing common areas of system memory space. In such a case, the data within each local cache are most likely to be shared or required by other processing units within the SMP data-processing system. On the other hand, when each processing unit is executing a different program, it is most likely that the data in the local caches are only required by the associated local processing unit such that there is probably little data sharing between processing units within the SMP data-processing system.

Hence, it is one of the objectives of the present invention to provide a method to enhance the utilization of cache memories within an SMP environment in order to accommodate different styles of program execution, such as those mentioned above. In the case in which data-sharing is normally demanded, it is beneficial to have cache memories at the lowest level (e.g., the L3 caches in FIG. 1) to behave as a single shared cache so as to avoid duplicate data storage in more than one cache memory. On the other hand, in the case in which data-sharing is normally not demanded, it is beneficial to have the data pertaining to the local processing unit to remain within the cache memories associated with the local processing unit as much as possible, instead of storing the data in a cache memory associated with another processing unit. In light of that, it is a preferred embodiment of the present invention to provide a mode select for each cache memory within a SMP data-processing system. The mode selection is preferably between a shared mode and a private mode. For the purpose of illustration, only L3 caches are utilized to explain the present invention; however, it is understood that the principle of the present invention may be applicable to any level of cache memories.

In a shared mode, all L3 caches within the SMP data-processing system are logically combined, each representing different segments of the system memory. For example, if there are a total of four L3 caches within the SMP data-processing system, then these four L3 caches are logically combined to represent four different segments that together form the total address space of the system memory. These four segments may or may not be contiguous but they must be from different address spaces of the system memory. From the stand point of each processing unit within the SMP data-processing system, all four L3 caches become one "giant" L3 cache. In other words, if each of the L3 caches is 4 MBytes in size, then in the shared mode, each processing unit will essentially have a 16 MBytes L3 cache representing the entire address space of the system memory. Data stored in a non-local L3 cache will be transferred to a requesting processing unit by intervention protocol via the interconnect. In essence, in the shared mode, the more L3 caches which are added to the SMP data-processing system, the more total L3 cache spaces all processing units effectively have. As such, the "cache hit" ratio should be higher than when each L3 cache operates independently.

In a private mode, each L3 cache may individually store data from any location within the system memory. At any point in time, one or more L3 caches may contain shared copies of the same data. From a processing unit stand point, each processing unit retains its own local L3 cache. In other words, if there are four L3 caches within the entire SMP data-processing system and each of the four L3 caches is 4 MBytes in size, then in the private mode, each processing unit will essentially have 4 MBytes of L3 cache capable of caching data from any location within the system memory.

Intervention may still be performed in the private mode, though the frequency of intervention is expected to be lower than in the shared mode.

Figure 2:
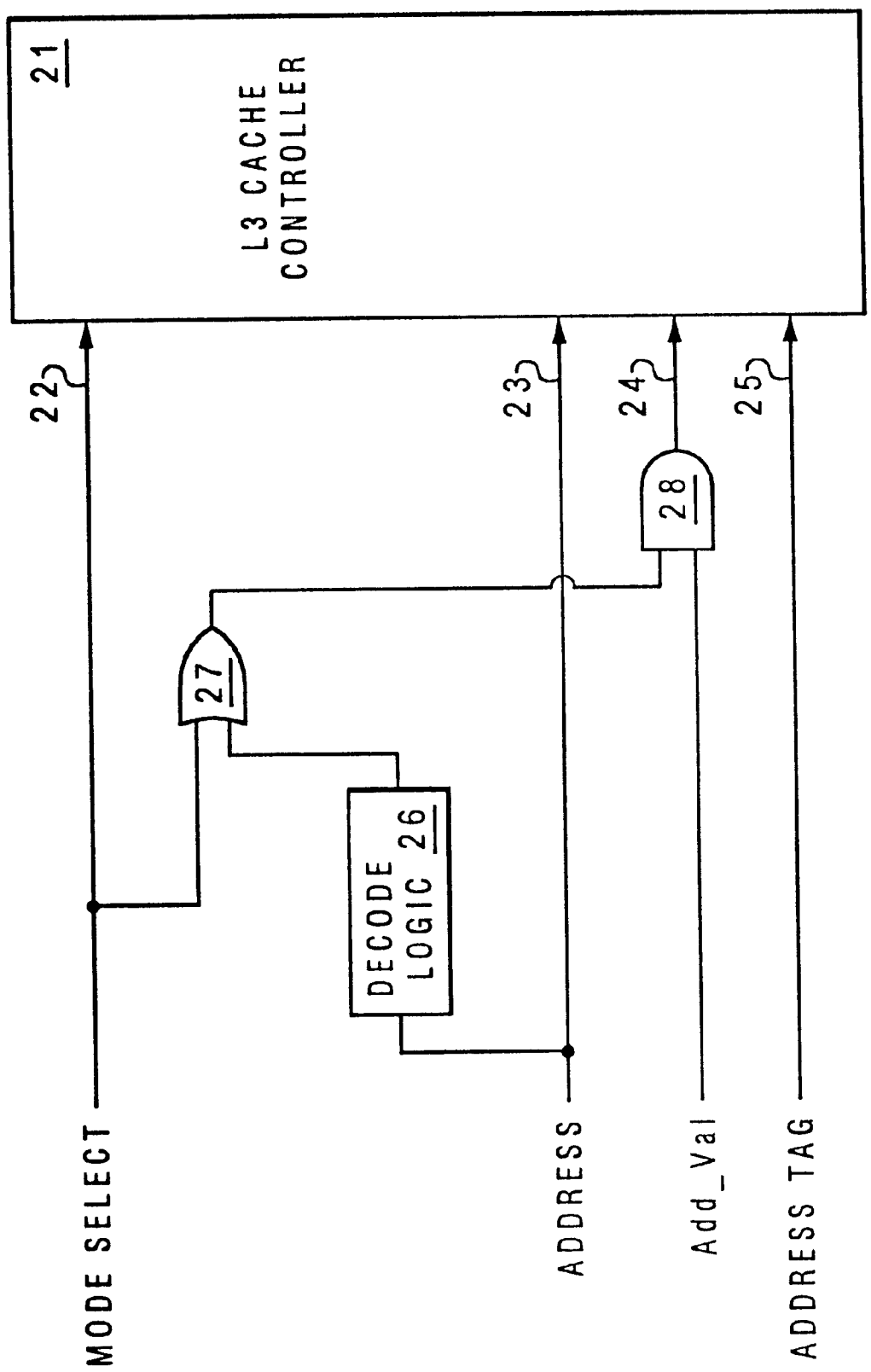
FIG. 2 is a block diagram illustrating an apparatus for providing a mode select for enhancing cache memory utilization within a SMP data-processing system, in accordance with a preferred embodiment of the present invention.

With reference now to FIG. 2, there is depicted a block diagram illustrating an apparatus for providing a mode select for enhancing cache memory utilization within a SMP data-processing system, in accordance with a preferred embodiment of the present invention. As shown, L3 cache controller 21 has four signal inputs—mode select input 22, address bus input 23, Add_Val input 24, and tag input 25.

Mode select input 22 selects one of the two preferred modes of operation for an associated L3 cache. This mode selection allows the associated L3 cache to be operated under a shared mode or a private mode, as detailed supra. The mode selection signal may be controlled by either software or hardware as it is deemed appropriate for a specific application. Address bus input 23 receives real addresses from system bus 20. Add_Val input 24 indicates when an address is valid. An assertion of Add_Val 24 allows an incoming address received at address bus input 23 to be read by L3 cache controller 21. Tag input 25 is for the input of a tag that is associated with the address at address bus input 23 and identifies the source of the address.

As shown, the mode select signal is combined with a decode logic signal from decode logic 26 via an OR gate 27 to provide a qualifying signal. This qualifying signal is then combined with an address valid signal via an AND gate 28 to provide a true address valid signal to be input to Add_Val input 24. As a preferred embodiment of the present invention, a selection of a private mode is indicated when the mode select signal has a value of logical "1" and a selection of a shared mode is indicated when the mode select signal has a value of a logical "0". When the mode select signal is a logical "1," the decode logic signal from decode logic 26 is essentially a don't care such that the address valid signal is never gated and L3 cache controller will be presented with any valid address at address bus input 23. This means the L3 cache is operating in private mode, and the L3 cache can store data associated with any address in the system memory.

On the contrary, when the mode select signal is a logical "0," decode logic signal from decode logic 26 dictates whether or not an address on address bus input 23 should be made visible to L3 cache controller 21. In the shared mode, each of the L3 caches within the SMP data-processing system can store only a portion of the contiguous address space of the system memory. Hence, decode logic 26 will determine whether or not the incoming address is within the address range that the associated L3 cache stores. Only when the address is within the valid address space will L3 cache controller 21 be accessed. If there are four L3 cache controllers (i.e., four L3 caches also) within the SMP data-processing system, only one of the four L3 cache controllers will have the address valid signal asserted at any given time so that data can be stored in its associated L3 cache.

As has been described, the present invention provides a method for enhancing cache memory utilization within a SMP data-processing system. The present invention allows all the cache memories within the SMP data-processing system to be operated under either a private mode or a shared mode in order to take advantage of the way a software program is being executed within the SMP data-processing system.

While the invention has been particularly shown and described with reference to a preferred embodiment, it will be understood by those skilled in the art that various changes in form and detail may be made therein without departing from the spirit and scope of the invention.

What is claimed is:

1. A symmetric multiprocessor data processing system comprising:

a system memory;

a plurality of processing units coupled to said system memory via an interconnect, wherein each of said processing units includes a cache memory for storing a subset of data contained within said system memory; and a cache controller included within each one of said processing units for controlling an associated cache memory, wherein said cache controller includes a mode select to allow said associated cache memory to be selectively operated under a shared mode or a private mode; wherein said shared mode enables each of said associated cache memories to represent only a respective non-overlapping segment of said system memory such that a combination of all of said associated cache memories represents an entire address space of said system memory; and wherein said private mode enables each of said associated cache memories to represent an entire address space of said system memory.

2. The symmetric multiprocessor dataprocessing system according to claim 1, wherein said symmetric multiprocessor dataprocessing system further includes decode logic coupled to said mode select to provide an address valid signal.

3. The symmetric multiprocessor dataprocessing system according to claim 1, wherein said plurality of processing units are substantially identical.

4. The symmetric multiprocessor dataprocessing system according to claim 1, wherein said interconnect is a system bus or a cross-bar switch.

5. A method for assigning cache memory utilization within a symmetric multiprocessor dataprocessing system including a plurality of processing units, wherein each of said plurality of processing units is associated with a cache memory for storing a subset of data contained within a system memory, said method comprising the steps of:

permitting all of said cache memories to be selectively operated in either a shared mode or a private mode;

in said shared mode, enabling each of said cache memories to represent only a respective non-overlapping segment of said system memory such that a combination of all of said cache memories represents an entire address space of said system memory; and in said private mode, enabling each of said cache memories to represent said entire address space of said system memory.

6. The method according to claim 5, wherein said permitting step is performed by a cache controller and a decode logic.

7. The method according to claim 5, wherein said plurality of processing units are substantially identical.

* * * * *